F. G. WINNEK.
COMBINED TRICYCLE AND ROCKING HORSE.
APPLICATION FILED OCT. 16, 1919.

1,338,545. Patented Apr. 27, 1920.

WITNESSES

INVENTOR
FREDERICK GIDEON WINNEK
BY
ATTORNEYS

UNITED STATES PATENT OFFICE.

FREDERICK GIDEON WINNEK, OF FAIRBURY, NEBRASKA.

COMBINED TRICYCLE AND ROCKING-HORSE.

1,338,545.  Specification of Letters Patent.  Patented Apr. 27, 1920.

Application filed October 16, 1919. Serial No. 330,966.

*To all whom it may concern:*

Be it known that I, FREDERICK GIDEON WINNEK, a citizen of the United States, and a resident of the city of Fairbury, in the county of Jefferson and State of Nebraska, have invented a new and Improved Combined Tricycle and Rocking-Horse, of which the following is a full, clear, and exact description.

The present invention relates to a combined tricycle and hobby horse, and has particular reference to a device of this character in which the rocking horse provides a seat on the tricycle and in which the rocking motion of the seat thus provided is converted into a drive for the traction wheels of the tricycle.

The primary object of the invention is to provide a novel amusement device for children which will combine all of the amusing features of a hobby horse with those of a tricycle.

A further object of the invention is to provide a device of the character described which may be manufactured at a comparatively modest cost, at the same time rendering the construction such that it may be easily manipulated by children without overexertion.

With these and still further objects in view; the invention will be more readily understood upon reference to the accompanying drawing, in which.

Figure 1:
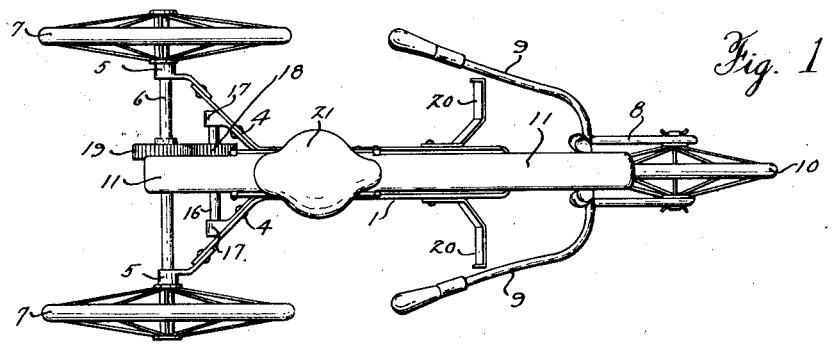
Figure 1 is a plan view of the device.
Figure 2:
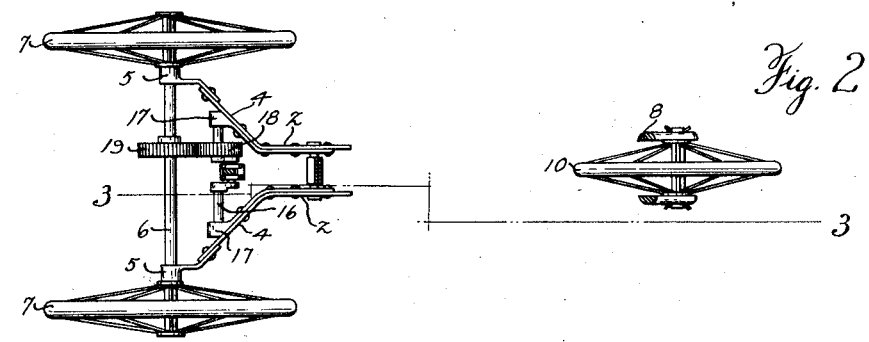
Fig. 2 is a sectional view on the line 2—2, Fig. 3.
Figure 3:
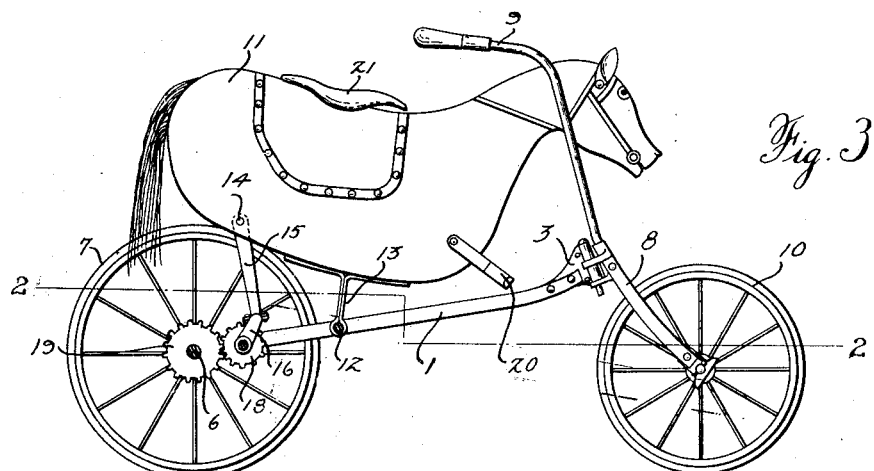
Fig. 3 is a sectional view on the line 3—3, Fig. 2.

Referring to the drawing in detail the device will be described as it is shown as a combined hobby horse and tricycle. However, it will of course be understood that in reducing the invention to practice, a bicycle or even a four-wheel vehicle may be used in lieu of the tricycle and instead of using a hobby horse any other seat may be employed without sacrificing the scope of the invention.

According to the preferred embodiment the tricycle is constructed with a frame 1 of any suitable construction, but preferably comprising a pair of longitudinal members 2 spaced apart with their front ends converging and secured to a block 3. The opposite ends of the members 2 being bent outwardly as at 4 and terminating in journaled bearings 5 made to receive the ends of the axle 6 on which are mounted traction wheels 7. Pivoted to the frame block 3 is the fork 8, to which the handle bars 9 are secured for guiding the steering wheel 10, which is mounted with freedom of rotation on its axle between the forks 8.

The hobby horse 11 is preferably pivoted to the frame 1 about midway the ends of the longitudinal members 2, the pivoted mounting comprising a short shaft 12 which is mounted in and bridging the space between the members 2. Mounted on this short shaft 12 with freedom of rotation is a strap 13 which extends vertically with its ends secured to the under-side of the hobby horse 11. Pivoted as at 14 to the hobby horse 11 is a link 15 which is connected to a crank shaft 16 mounted parallel of the axle 6 in the bearings 17. Keyed to the crank shaft 16 is a driving gear 18 which is in mesh with a driven gear 19, likewise keyed on the axle 6.

The hobby horse is provided with suitable foot rests 20 on its opposite sides and a saddle 21. With this construction the saddle 21 may be occupied with the feet of the occupant supported by the foot rests 20 and with the hands of the occupant grasping the handle-bars 9, whereupon by a slight effort on the part of the occupant the horse may be caused to rock about its pivot and by means of the driving connection between the hobby horse and the traction wheels the rocking motion thus produced by the hobby horse may be converted into a traction drive for the traction wheels 7 and impel the device. It will thus be seen that the advantages of a hobby horse and tricycle are combined in one device.

I claim:

1. In a device of the character described, and in combination with a tricycle having spaced frame members with traction wheels and a pivoted steering wheel and handle bars on the steering wheel, of a seat pivoted at about its center between the frame members of the tricycle intermediate the traction wheels and the steering wheel, a link pivoted to the seat and connected to a crank shaft mounted between the rear ends of the frame members, a driving gear on the crank shaft in mesh with a driven gear on the axle of the traction wheels, and foot rests on the seat in front of its pivotal connection with the frame members whereby the seat may be occupied with the occupant's feet supported by the foot rests, and with the hands gripping the handle bars so that the seat may be rocked about its pivot for imparting a traction drive through the crank arm and drive gears to the traction wheels.

2. The combination as set forth in claim 1, and in which the said frame of the tricycle comprises a pair of frame members having their front ends joined together adjacent the pivot point of the front steering wheel, and having diverging rear ends, to provide journal bearings for the axle of the traction wheels, and in which the driving and driven gears are supported intermediate the outwardly bent ends of the frame members by the axle of the traction wheels and the crank shaft respectively, the crank shaft being journaled in bearings mounted on the said frame members.

FREDERICK GIDEON WINNEK.